United States Patent [19]

Trocciola et al.

[11] 4,317,866
[45] Mar. 2, 1982

[54] MOLTEN CARBONATE FUEL CELL ANODE

[75] Inventors: John C. Trocciola; Richard C. Nickols, Jr., both of Glastonbury, Conn.

[73] Assignee: United Technologies Corporation, Hartford, Conn.

[21] Appl. No.: 189,887

[22] Filed: Sep. 24, 1980

[51] Int. Cl.³ .............................................. H01M 8/14
[52] U.S. Cl. ...................................... 429/41; 429/44; 429/16
[58] Field of Search ..................... 429/41, 44, 46, 30, 429/33, 16, 193

[56] References Cited

U.S. PATENT DOCUMENTS

| 3,347,668 | 10/1967 | Clark et al. | 75/201 |
| 3,377,203 | 4/1968 | Mobius et al. | 429/33 |
| 3,467,552 | 9/1969 | Giner | 429/41 |
| 3,615,839 | 10/1971 | Thompson et al. | 429/16 |
| 3,615,862 | 10/1971 | Roth et al. | 429/13 |
| 3,622,394 | 11/1971 | Bawa et al. | 429/102 X |
| 4,041,210 | 8/1977 | Van Dine | 429/16 |
| 4,080,487 | 3/1978 | Reiser | 429/16 |
| 4,115,628 | 9/1978 | Bonnemay et al. | 429/44 |

FOREIGN PATENT DOCUMENTS 893853  2/1972  Canada .

OTHER PUBLICATIONS

Broers, G. H. J., *High Temperature Galvanic Fuel Cells*, Academisch Proefschrift, (1958).
Broers, G. H. J. and Van Ballegoy, H. J. J., "Phase Equilibria in Li-Na-K Carbonate/Aluminate Systems", Paper presented at the 3rd International Symposium on Fuel Cells, Brussels, Jun. 1969.
Huynink, H. E., "Cell Assemblies for a Molten Carbonate Fuel Battery. II. Electrolyte Plate Discs for Molten Carbonate Fuel Cells", Energy Convers. 12, 139–143, (1972).
Tuller et al., "Doped Ceria as a Solid Oxide Electrolyte", *J. Electrochem. Soc.*, vol. 122, No. 2, pp. 255–259, 1975.

Primary Examiner—Anthony Skapars
Attorney, Agent, or Firm—Harry J. Gwinnell

[57] ABSTRACT

A molten carbonate fuel cell ceria anode and a molten carbonate fuel cell including such anode are described. The ceria anode, in addition to having the requisite electrolyte compatibility, catalytic activity, and electron conductivity, has improved oxidation resistance and structural stability as well.

4 Claims, 2 Drawing Figures

MOLTEN CARBONATE FUEL CELL ANODE

CROSS REFERENCE TO RELATED APPLICATIONS

Commonly assigned, copending application Ser. No. 189,886, filed Sept. 24, 1980 is directed to ceria matrix material for molten carbonate fuel cells; and commonly assigned, copending application Ser. No. 189,888, filed Sept. 24, 1980 is directed to an anode-matrix material for molten carbonate fuel cells.

DESCRIPTION

1. Technical Field

The field of art to which this invention pertains is molten carbonate fuel cells and more particularly to molten carbonate fuel cell anodes.

2. Background Art

Fuel cells which use alkali-metal carbonates as the electrolyte are well known in the art and are generally referred to as molten carbonate fuel cells since the electrolyte is liquid at typical operating temperatures in the range of 550° C.–750° C. (1022° F.–1382° F.). The electrolyte is usually mixed with an inert particulate or fibrous material which remains solid during cell operation and maintains the space between the cathode and anode portions of the cell and prevents the mixing of the two reactants. The combination of electrolyte and inert material is referred to as a tile when in the solid state at room temperature. Most molten carbonate fuel cell electrolytes are ternary or binary mixtures of, for example, lithium carbonate, potassium carbonate, and sodium carbonate. Molten carbonate fuel cell systems in general are described in commonly owned U.S. Pat. Nos. 3,615,839; 4,041,210; and 4,080,487.

Because of the highly corrosive environment which exists in fuel cells in general, there is an on-going search for a stable anode material which can withstand the rigors of such use. For example, Canadian Pat. No. 893,853 and U.S. Pat. No. 3,377,203 discuss the advantages of various metal oxides in corrosive fuel cell environments and particularly refer to ceria in potassium hydroxide electrolyte solutions and solid electrolyte solutions such as zirconia, calcium oxide, and alumina. Similarly, U.S. Pat. No. 3,622,394 teaches the advantages of using magnesium oxide, magnesium aluminate, and lithium aluminate as matrix material.

While it is known in the art, as evidenced by the Canadian reference that such things as zirconium oxide, thorium oxide, cerium oxide, and aluminum oxide have good corrosion stability in molten alkali hydroxides or aqueous strong acids and alkalis, there is no way to predict from this that any particular metal oxide would have exceptional or even acceptable performance in a molten carbonate fuel cell environment. For example, a zirconium oxide is well known to be stable in potassium hydroxide. However, its use is unacceptable in a molten carbonate fuel cell. See the Institute of Gas Technology article, "Development of Molten Carbonate Fuel Cells", A.G.A. *Project DC*-4-1 Final Report, Chicago, 1967; and the Huynink, H. E. article, "Cell Assemblies for a Molten Carbonate Fuel Battery. II. Electrolyte Plate Discs for Molten Carbonate Fuel Cells", *Energy Convers.* 12, 139–143 (1972).

An article by Broers (*High Temperature Galvanic Fuel Cells,* Broers, G. h. J.) discusses the use of $CeO_2$ in a fuel cell but recognizes no superiority as compared to other materials such as MgO in this environment, and in fact, references some dissolution of the $CeO_2$. And the MgO which is reported to be stable in alkaline carbonate systems, in fact demonstrates such problems as matrix cracking, structural degradation and reactivity with the electrolyte in a molten carbonate system. See the Broers, G. H. J. and Van Ballegoy, H. J. J. article entitled "Phase Equilibria in Li-Na-K Carbonate/Aluminate Systems", Paper presented at the 3rd International Symposium on Fuel Cells, Brussels, June 1969; Aubry, J. and Klein, F. article entitled "Etude de l'aluminate de lithium", *Chim. Ind. Genie Chim.* 103 (13), 1643–1644 (1970); and Huynink, H. E. article entitled "Cell Assemblies for a Molten Carbonate Fuel Battery. II. Electrolyte Plate Discs for Molten Carbonate Fuel Cells", *Energy Convers.* 12, 139–143 (1972). And while the conductivity of ceria has been recognized, this has been in conjunction with its use as an electrolyte material and not an anode material. (Tuller et al, "Doped Ceria as a Solid Oxide Electrolyte", *J. Electrochem. Soc.,* vol. 122, No. 2, pps 255–259, 1975).

Though great strides have been made in the discovery of various materials for use in corrosive fuel cell environments, there is much room for improvement in anode materials for the long term use desired in this art. Furthermore, it is important to keep in mind that molten carbonate electrolytes provide a completely different type of chemical, thermal and corrosive environment than any other type of fuel cell environment. In particular, the reactions being catalyzed and the corrosive environment produced under molten carbonate fuel cell operating conditions are totally different than produced in other fuel cell environments.

The particular property requirements for an anode in a molten carbonate fuel cell make the search for satisfactory material even more difficult. For example, not only must such anode material be relatively stable in such an adverse environment, but it must be compatible with the electrolyte, catalytically active and electron conductive as well. Accordingly, the search for improved anode material involves much more than just stability. For example, although conventionally used nickel based material (note U.S. Pat. No. 3,347,668; 3,615,862; and 4,115,628) has the requisite electrolyte compatibility, catalytic activity and electron conductivity, it suffers from such things as sintering. As a result of this latter property, the nickel anode which is required to be porous, consolidates with use closing the pores and causing countless problems. This consolidation occurs because of the reducing atmosphere, compressive load, and high temperatures utilized with the molten carbonate fuel cell process. Furthermore, a stack of these nickel anodes in the cell bundle gets thinner and thinner with use, resulting in pore closure causing gaps in the stack with resulting lapses in electronic and ionic communication through the stacks. Another problem with conventional anodes such as nickel is oxidation during cell shut-down. Positive steps are required of many anode materials to keep oxidizing reactants (such as air) away from such anode material especially during cell shut-down. Failure to do so or improper protection of such anodes will result in anode failure.

Accordingly, there is a need in this art for a molten carbonate anode having not only increased stability but the requisite electron conductivity, catalytic activity and electrolyte compatibility as well.

DISCLOSURE OF INVENTION

This invention is directed to an improved molten carbonate ceria anode, and specifically a molten carbonate fuel cell incorporating such anode. The ceria anode, in addition to having the requisite electron conductivity, catalytic activity, and electrolyte compatibility to be used in a molten carbonate fuel cell, has much improved structural stability over conventional anodes in this art.

The foregoing and other features and advantages of the present invention will become more apparent from the following description and accompanying drawings.

BEST MODE FOR CARRYING OUT THE INVENTION

The ceria used according to the present invention is preferably of the highest grade available, e.g. 99% by weight pure or better. However, a lower grade, such as 90%–95% purity ceria can also be used. Tolerable impurities comprise such things as other rare earth oxides, such as $Y_2O_3$, etc. Use of the term "ceria" throughout the specification and claims is meant to include the well-known $CeO_2$ form as well as reduced forms such as $Ce_2O_3$ or $CeO_{2-x}$ wherein x can vary between 0 and 0.5.

The preferred molten carbonate electrolyte comprises a eutectic mixture of lithium carbonate and potassium carbonate. However, any molten carbonate electrolyte system may be used as, but not limited to, alkali metal or alkali earth carbonates, conventional lithium carbonate, potassium carbonate, sodium carbonate or combinations thereof.

Figure 1:
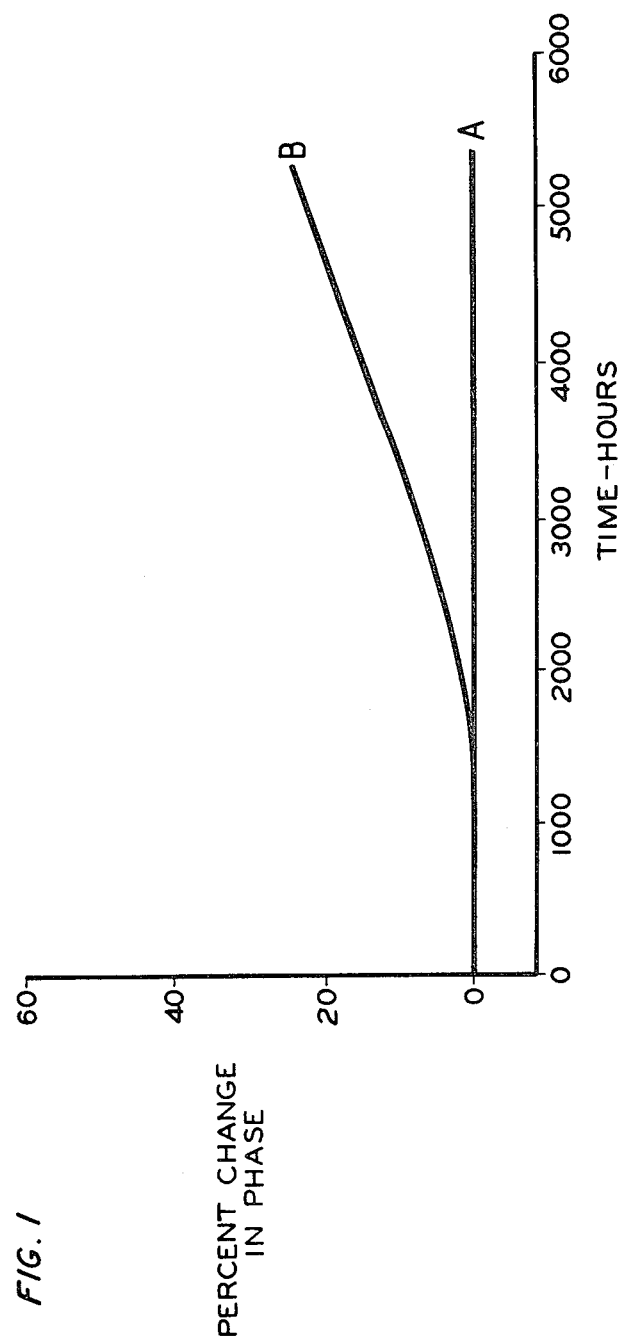
FIG. 1 shows the compatibility of ceria with molten carbonate under molten carbonate fuel cell operating conditions.

Stability of the anode material of the present invention was measured in tests which allowed the maximum available carbonate electrolyte to contact the ceria particles. The ceria particles were immersed and surrounded by molten carbonate electrolyte heated to at least 1200° F. In one case the fuel gas environment was simulated by allowing a mixture comprising approximately 51% $H_2$, 10% $CO_2$, 10% CO and 29% $H_2O$, all percents by volume, to pass over the ceria-carbonate on a continuing basis. In other tests the oxidant environment was simulated by utilizing a $CO_2$ gas at temperatures up to 1400° F. in the same manner. These tests not only simulate the fuel cell environment, but simulate this environment with maximum ceria exposure to the carbonate. The carbonate electrolyte used was a preferred binary eutectic mixture of 62% by volume lithium carbonate and 38% by volume potassium carbonate. As evidenced by FIG. 1 showing the fuel gas environment testing described above, where curve A is the ceria (and B conventional high purity $\gamma$ $LiAlO_2$ material) not only was there no sign of corrosion, crystalline phase change, or reactivity of the ceria with the molten carbonate after 2000 hours of testing, but no signs of instability were evident even after more than 5000 hours of testing. The ceria remained in its original cubic phase with substantially no change in mechanical strength or weight loss during the test duration. The ceria tested under $CO_2$ gas flow and the same conditions (1375° F.) showed no crystalline phase change after 2000 hours of testing.

It is quite unexpected that the ceria performs in such manner in the molten carbonate environment since as stated above, other ceramics such as zirconium oxide and potassium titanate which are compatible (as is ceria) with molten KOH under KOH fuel cell operating conditions are incompatible with molten carbonate under molten carbonate fuel cell operating conditions. For example, zirconia under the same test conditions recited above for ceria, reacts with at least one of the carbonate electrolytes according to the following equation:

$ZrO_2 + Li_2CO_3 = Li_2ZrO_3 + CO_2$, with a corresponding change in volume. Furthermore, ceria being the first element of the rare earths in the Periodic Table, is similar to 15 other elements in this series. Yet, lanthanum oxide, which is the nearest neighbor to ceria in the rare earth series, is not compatible with molten carbonate under fuel cell operating conditions. Test results show that lanthanum oxide forms lanthanum carbonate very quickly, e.g. after 390 hours at 1400° F. under $CO_2$ gas flow in the presence of carbonate as described above. Therefore, it might be expected that ceria would also react in the same way. However, as evidenced above, not only does ceria not react in such a way, but the ceria is far superior to any known anode material in this environment.

In addition to the compatibility of the ceria with molten carbonate electrolyte under molten carbonate fuel cell operating conditions, the ceria has the advantage of providing increased structural stability over conventional anode material such as nickel. By structural stability is meant resistance to sintering, and resistance to creep. Because of the high compressive loads which anode materials are subjected to in a molten carbonate fuel cell environment (e.g. 50 to 100 psi) and the high temperatures (1200°–1400° F.) and reducing atmosphere, there is a tendency for conventional anode material such as nickel to sinter as discussed above. In addition to the sintering, conventional anode material such as nickel also experiences mechanical deformation in the form of creep. Again, this is attributable to the compressive loads and high temperatures involved in a molten carbonate fuel cell environment. Such creep also results in a compression of the anode material and a closure of pores with ultimate inoperability of the molten carbonate fuel cell. However, because of ceria's high structural stability under these conditions, no such creep, mechanical deformation, or sintering is experienced by the ceria anode material.

Another advantage of the ceria anode of the present invention is its resistance to oxidation. Conventional electrode material such as nickel has a tendency to oxidize when subjected to an oxidative environment such as air. Accordingly, positive steps to prevent an oxidizing environment from reaching the nickel anode is required during start-up and shut-down of the molten carbonate fuel cell, and also during unscheduled shutdowns. Such steps include precise sealing of the anode material from oxidizing environments such as air and inert gas flow to prevent the oxidizing environment from reaching the anode material. The ceria, being oxidation resistant, requires no such special handling.

Figure 2:
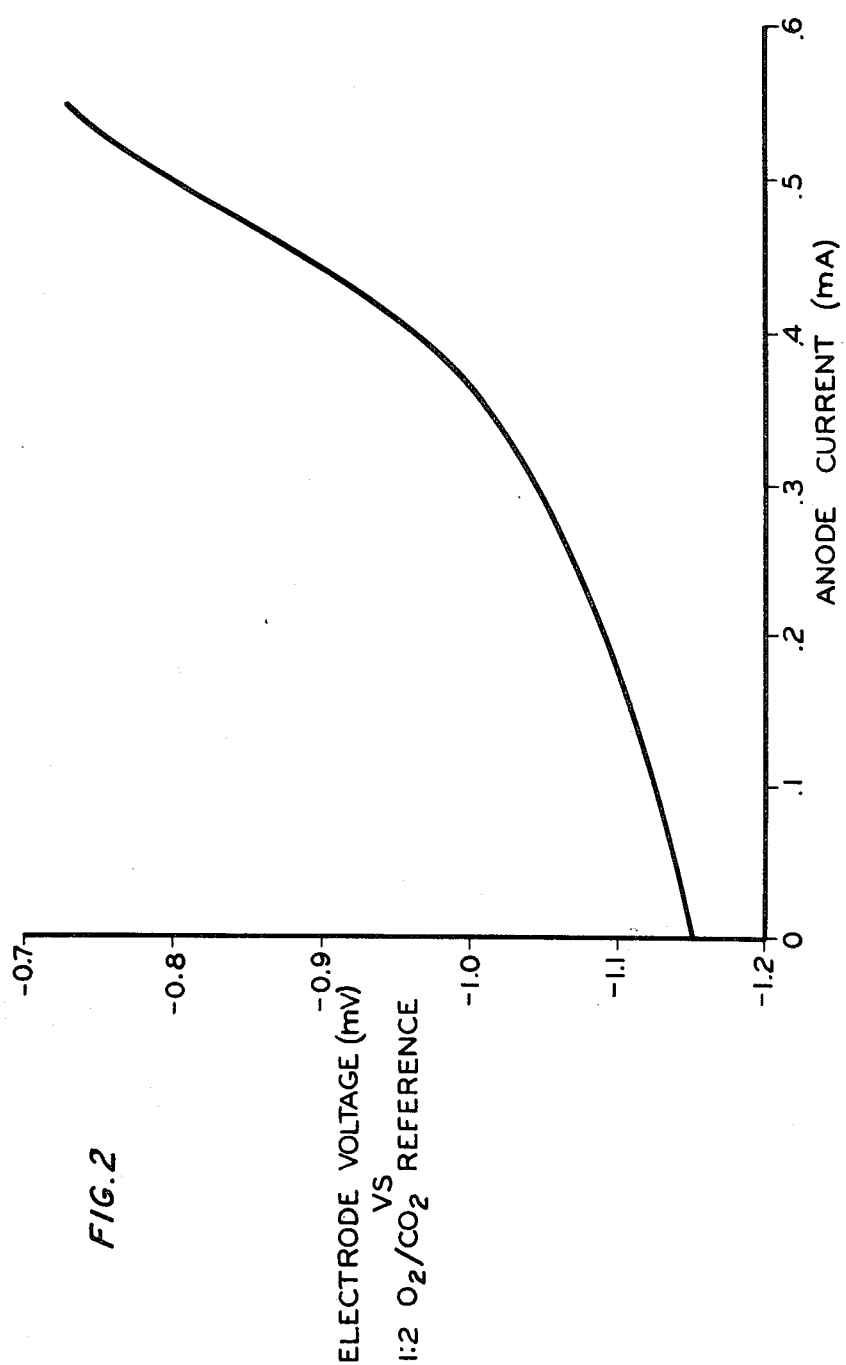
FIG. 2 demonstrates the ability of ceria to function as an anode material in a molten carbonate fuel cell.

Ceria under a reducing atmosphere such as would be experienced at the anode portion of the cell is also highly conductive. Acting as a highly conductive material, the ceria is very useful as an anode. FIG. 2 further demonstrates this ability of the ceria to function as an anode for hydrogen in molten carbonate systems. In this figure, electrode voltages (in millivolts vs. a 1:2 $O_2$/$CO_2$ reference electrode) are plotted as a function of anode current (in milliamps). The electrolyte utilized for the test was a binary eutectic mixture of lithium carbonate and potassium carbonate. The fuel gas utilized was a mixture of (percents by volume) 92.5% $H_2$, 2% $CO_2$, 5.5% CO saturated at 127° F. with water. As can be seen from the graph, the ceria has definite anode catalytic activity in promoting the oxidation of hydrogen.

In addition to the above recited properties, ceria anodes in a molten carbonate fuel cell have the advantage of being more tolerant than conventional anode material to sulfur containing compounds which may be present in the fuel gas. Conventional anode material such as nickel is known to react with such compounds (such as hydrogen sulfide) resulting in performance losses in the fuel cell. However, the ceria being significantly less reactive than such conventional material as the nickel would be less susceptible to performance losses due to such electrode poisoning.

Exemplary pore sizes for the anode of the present invention is at least approximately one micron in diameter (e.g. 2 microns to 10 microns) with a porosity of greater than 40% (e.g. about 41% to about 80%). And any conventional ceramic forming processing techniques can be used to form the ceria anode such as firing particulate ceria material at sufficiently high temperatures to produce the desired pore size and porosity described above. Compression molding of the ceria particles in combination or admixture with the molten carbonate electrolyte is also possible.

While conventional cathode material such as nickeloxide or conductive perovskites can be used and operated as a conventional cathode in this environment, as can be appreciated conventional state of the art anode material is prone to mechanical and structural problems which can become the life limiting component of the cell. The ceria anode of the present invention offers great potential in preventing such things as anode creep, sintering, and cost problems associated with such a life limiting component.

Although this invention has been shown and described with respct to detailed embodiments thereof, it will be understood by those skilled in the art that various changes in form and detail thereof may be made without departing from the spirit and scope of the claimed invention.

We claim:

1. A fuel cell including an electrolyte-matrix containing an alkali metal carbonate electrolyte which is molten during operation of the fuel cell, an anode electrode in contact with the electrolyte-matrix and a cathode electrode spaced apart from the anode electrode and in contact with the electrolyte-matrix, wherein the improvement comprises a molten carbonate electrolyte compatible, oxidation resistant, structurally stable, catalytically active, electron conductive ceria anode.

2. The fuel cell of claim 1 wherein the ceria anode has a pore size greater than 1 micron.

3. The fuel cell of claim 1 wherein the ceria anode has a porosity greater than 40%.

4. The fuel cell of claim 1 wherein the electrolyte comprises lithium carbonate, potassium carbonate, sodium carbonate, or mixtures thereof.

* * * * *